United States Patent
Ahn et al.

(10) Patent No.: US 10,283,794 B2
(45) Date of Patent: May 7, 2019

(54) ELECTRICITY AND SYNGAS CO-GENERATION SYSTEM USING POROUS SOLID OXIDE FUEL CELLS

(71) Applicants: Jeongmin Ahn, Manlius, NY (US);
Ryan Milcarek, Syracuse, NY (US);
Kang Wang, Greensburg (CN);
Pingying Zeng, Greensburg (CN)

(72) Inventors: Jeongmin Ahn, Manlius, NY (US);
Ryan Milcarek, Syracuse, NY (US);
Kang Wang, Greensburg (CN);
Pingying Zeng, Greensburg (CN)

(73) Assignee: Syracuse University, Syracuse, NY (US)

( * ) Notice: Subject to any disclaimer, the term of this patent is extended or adjusted under 35 U.S.C. 154(b) by 104 days.

(21) Appl. No.: 15/373,084

(22) Filed: Dec. 8, 2016

(65) Prior Publication Data
US 2017/0170503 A1    Jun. 15, 2017

Related U.S. Application Data

(60) Provisional application No. 62/265,003, filed on Dec. 9, 2015.

(51) Int. Cl.
| | |
|---|---|
| *H01M 8/06* | (2016.01) |
| *H01M 8/0612* | (2016.01) |
| *H01M 8/00* | (2016.01) |
| *H01M 4/86* | (2006.01) |
| *H01M 4/90* | (2006.01) |
| *H01M 8/0662* | (2016.01) |
| *C01B 3/40* | (2006.01) |
| *H01M 8/0637* | (2016.01) |
| *H01M 8/124* | (2016.01) |

(52) U.S. Cl.
CPC ............. *H01M 8/0618* (2013.01); *C01B 3/40* (2013.01); *H01M 4/8621* (2013.01); *H01M 4/9033* (2013.01); *H01M 8/004* (2013.01); *H01M 8/0637* (2013.01); *H01M 8/0662* (2013.01); *C01B 2203/0261* (2013.01); *C01B 2203/067* (2013.01); *C01B 2203/1058* (2013.01); *C01B 2203/1082* (2013.01); *C01B 2203/1235* (2013.01); *H01M 2008/1293* (2013.01)

(58) Field of Classification Search
None
See application file for complete search history.

(56) References Cited

U.S. PATENT DOCUMENTS

| | | | |
|---|---|---|---|
| 9,362,572 B2 * | 6/2016 | Devoe | H01M 8/0202 |
| 2009/0148742 A1 * | 6/2009 | Day | H01M 4/8657 |
| | | | 429/483 |

(Continued)

*Primary Examiner* — Scott J. Chmielecki
(74) *Attorney, Agent, or Firm* — David L. Nocilly; George R. McGuire; Bond Schoeneck & King, PLLC

(57) ABSTRACT

A porous solid oxide fuel cell (PSOFC) system for electricity and syngas co-generation. The system has a porous layer, a porous electrolyte layer with catalyst, a porous anode layer, and a porous catalyst layer. A fuel air/$O_2$ mixture is introduced from through the porous cathode layer so that it next passes through the porous electrolyte layer with catalyst, then the porous anode layer, and finally the porous catalyst layer. Syngas exits the porous catalyst layer with electricity being produced across the anode and cathode layers.

14 Claims, 12 Drawing Sheets

(56) References Cited

U.S. PATENT DOCUMENTS

| | | | | |
|---|---|---|---|---|
| 2009/0324999 A1* | 12/2009 | Devoe | ............... | H01M 8/0202 |
| | | | | 429/469 |
| 2010/0151353 A1* | 6/2010 | Henne | ...................... | C23C 4/06 |
| | | | | 429/496 |
| 2010/0325878 A1* | 12/2010 | Zhang | ............... | H01M 8/1266 |
| | | | | 29/623.5 |
| 2012/0094213 A1* | 4/2012 | Ha | ..................... | H01M 8/1246 |
| | | | | 429/495 |
| 2015/0167186 A1* | 6/2015 | Hirata | ............... | H01M 8/0656 |
| | | | | 204/277 |
| 2016/0156058 A1* | 6/2016 | Takeuchi | ........... | H01M 8/1246 |
| | | | | 429/482 |
| 2018/0159146 A1* | 6/2018 | Iwakiri | .............. | H01M 8/1213 |

\* cited by examiner

ELECTRICITY AND SYNGAS CO-GENERATION SYSTEM USING POROUS SOLID OXIDE FUEL CELLS

BACKGROUND OF THE INVENTION

1. Field of the Invention

The present invention relates to fuel cells and, more specifically a porous solid oxide fuel cell for electricity and syngas co-generation.

2. Description of the Related Art

Fuel cells provide a clean and versatile means to directly convert chemical energy to electricity. Among the many types of fuel cells, solid-oxide fuel cells (SOFCs) have received considerable attention owing to their simplicity (no moving parts), fuel flexibility and use of inexpensive catalytic materials.

Among many fuel cell configurations, the development of single-chamber SOFCs (SC-SOFCs) has generated widespread interest due to its simple configuration in which both the anode and cathode of the cells are exposed to the same fuel-oxidant gas mixture. In this simple, one-chamber configuration, no sealant is necessary and the cell can be rapidly heated and cooled. The operation of this kind of fuel cell is based on the different catalytic selectivity of the anode and cathode. Under ideal conditions, the cathode reacts only on the oxygen activation, while the anode reacts only on the partial oxidation of fuel. The different catalytic selectivity of anode and cathode leads to an oxygen partial pressure gradient which drives continuous power output. Extensive studies have been conducted to improve the power output and systematic configurations of SOFCs and high power output which is comparable to dual chamber SOFCs (DC-SOFCs) has been achieved. However, SC-SOFCs requirement of fuel rich conditions for operation prohibits its application as excessive fuel must be supplied and wasted, thereby lowering system efficiency. Also, whether through thermal power or conventional fuel cells, power generation and the chemical energy conversion process of hydrocarbon fuels involves the emissions of $CO_2$ greenhouse gases.

If excessive hydrocarbon fuels could be simultaneously converted into value-added chemical products (like syngas) during electricity generation instead of $CO_2$, higher energy conversion efficiency could be expected along with zero emissions of environmental pollutants. Some researchers have shown the generation of electricity while simultaneously converting the fuel into value-added chemical products through a DC-SOFC reactor. However, using a DC-SOFC for gas co-generation is confronted with the problem that product selectivity and yield is restricted by the operating conditions of the fuel cell. Changes in the polarization current lead to significant changes in product composition and yield. Also, the direct exposure of the anode to pure hydrocarbons presents a serious coking problem. Similarly, electricity and syngas cogeneration systems based on conventional SC-SOFCs are capable of high power output and high syngas production but suffer from some drawbacks. For example, the oxidation reaction of fuel and oxidant is non-homogeneous distributed across the fuel cell, resulting in a high temperature gradient that can crack the fuel cell itself. In addition, only a small amount of the fuel can be utilized since most of fuel just passes through the fuel cell, thereby resulting in low fuel utilization and fuel concentration polarization losses. Furthermore, the current design of SC-SOFC system is that the fuel and oxidant flow is parallel to the fuel cell, resulting in low OCVs, as the utilization of oxygen in the upstream may result in the lack of oxygen at the cathode at the downstream. Finally, to get syngas production, a downstream catalyst is required which increases the complexity of system design. Thus, there is a need in the art for an improved electricity and syngas co-generation system that does not suffer from the drawbacks of conventional systems.

BRIEF SUMMARY OF THE INVENTION

The present invention is an electricity and syngas co-generation system based on a porous solid oxide fuel cell (ESCo-PSOFC). The PSOFC contains a porous cathode layer, a porous electrolyte layer containing catalyst, a porous anode, and a porous catalyst layer. A mixture of fuel and air/$O_2$ first passed through the porous cathode layer. Because the cathode layer is inert to reforming reactions, only oxygen is consumed at this stage. Next, the mixture passes through the porous electrolyte layer which contains a catalyst. In this layer, part of the mixture will be reformed to CO and hydrogen, which are the ideal fuels for SOFC operation. Next, the mixture passes through the anode layer and supplies the fuels for the SOFC operation. In this layer, the fuel cell reaction produces water and $CO_2$. Since the anode layer is an active reforming catalyst, the reforming reaction may also happen to produce water, CO, $CO_2$ and $H_2$. Finally, the exhaust from the anode layer passes through the catalyst layer, which reforms the exhaust to syngas: $H_2$ and CO.

More specifically, the porous solid oxide fuel cell comprises a porous cathode layer, a porous electrolyte and catalyst layer adjoining the porous cathode layer, a porous anode layer adjoining the porous electrolyte and catalyst layer, and a porous catalyst layer adjoining the porous anode layer. the porous cathode layer, the porous cathode layer, the porous electrolyte and catalyst layer and the porous catalyst layer may be formed into a tube. Three porous cathode layer may be the outermost layer of the tube, or the porous cathode layer may be the innermost layer of the tube. The end of the tube may be closed. The porous cathode layer, the porous cathode layer, the porous electrolyte and catalyst layer and the porous catalyst layer may alternatively extend along parallel planes. The present invention also comprises a method of co-generating electricity and syngas, comprising the steps of providing a porous solid oxide fuel cell, introducing a mixture of fuel and oxygen into the porous cathode layer, collecting syngas from the porous catalyst layer, and collecting electricity across the porous cathode layer and porous anode layer. The step of providing a porous solid oxide fuel cell may comprise providing a series of stacked porous solid oxide fuel cells. The step of introducing a mixture of fuel and oxygen into the porous cathode layer may comprise injecting the mixture of fuel and oxygen into the tube and the step of collecting syngas from the porous catalyst layer comprises collecting syngas from around the outside of the tube. The step of introducing a mixture of fuel and oxygen into the porous cathode layer may alternatively comprise introducing the mixture of fuel and oxygen into the outside of the tube and the step of collecting syngas from the porous catalyst layer comprises collecting syngas from inside of the tube.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
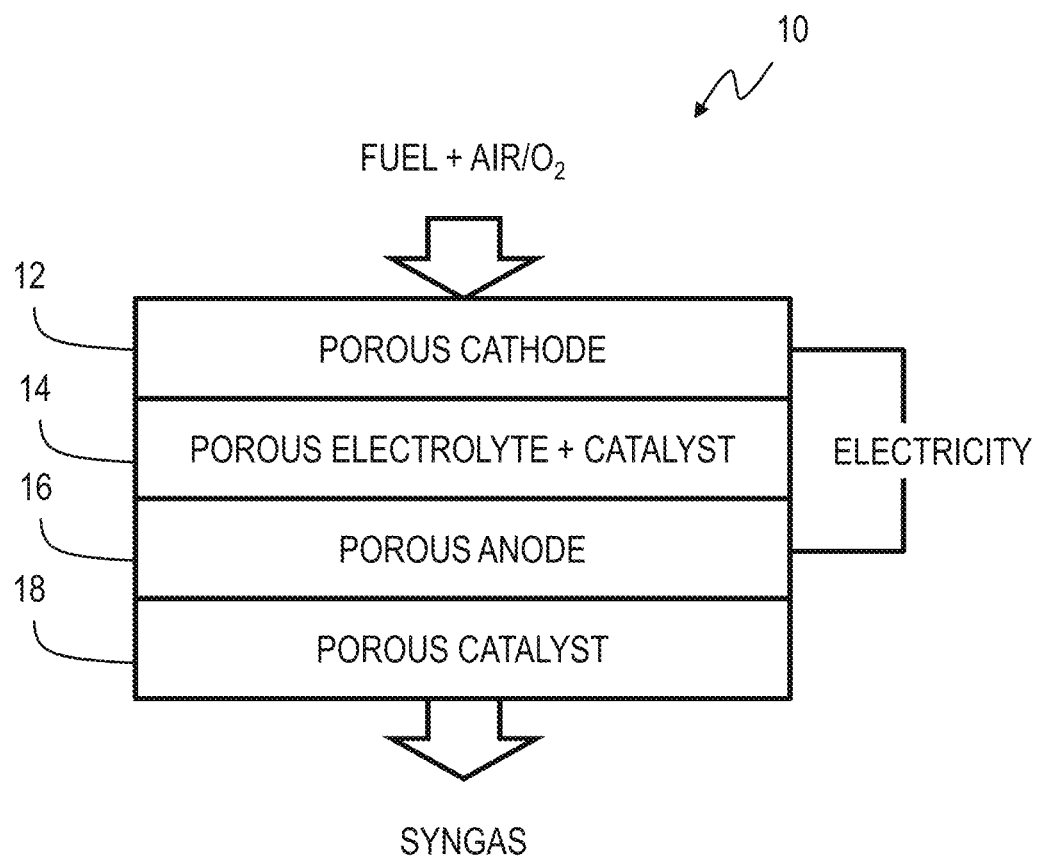
FIG. 1 is a schematic of a porous solid oxide fuel cell system according to the present invention.

Referring now to the drawings, wherein like reference numerals refer to like parts throughout, there is seen in FIG. 1, a porous solid oxide fuel cell (PSOFC) system 10 according to the present invention for electricity and syngas co-generation. System 10 comprises a porous layer 12, a porous electrolyte layer with catalyst 14, a porous anode layer 16, and a porous catalyst layer 18. A fuel air/$O_2$ mixture may introduced from through the porous cathode layer 12 so that it next passes through the porous electrolyte layer with catalyst 14, then the porous anode layer 16, and finally the porous catalyst layer 18, so that syngas exits the porous catalyst layer. Electricity is generated across the anode and cathode layers.

Figure 2:
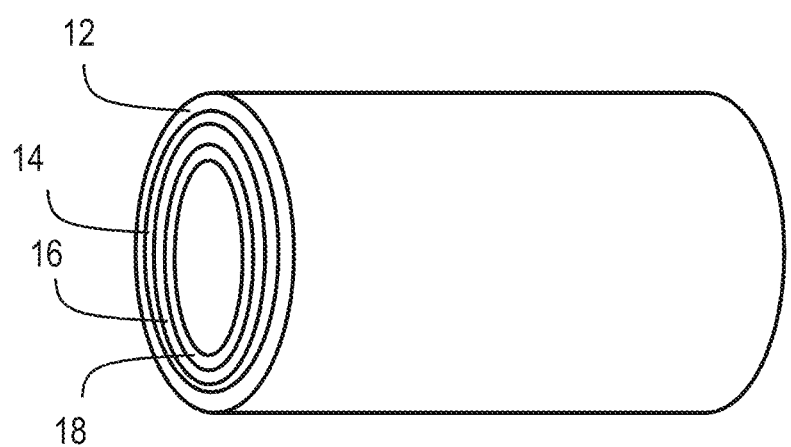
FIG. 2 is a schematic of an embodiment of a porous solid oxide fuel cell unit according to the present invention.
Figure 3:
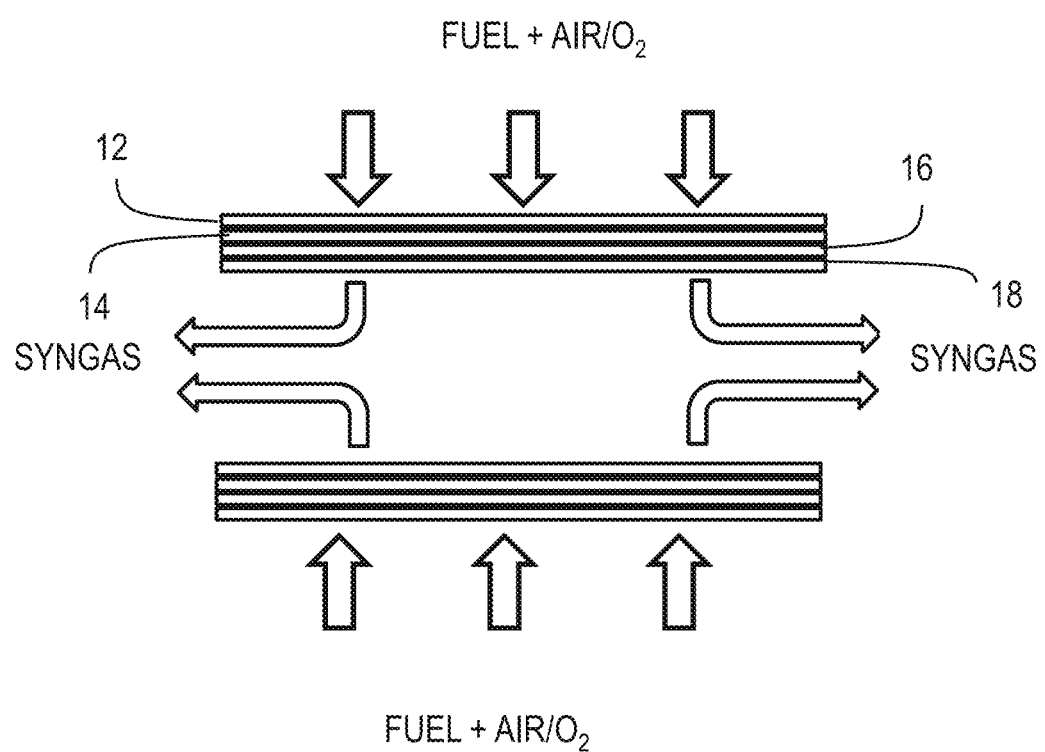
FIG. 3 is a cross-section of an embodiment of a porous solid oxide fuel cell unit according to the present invention.
Figure 4:
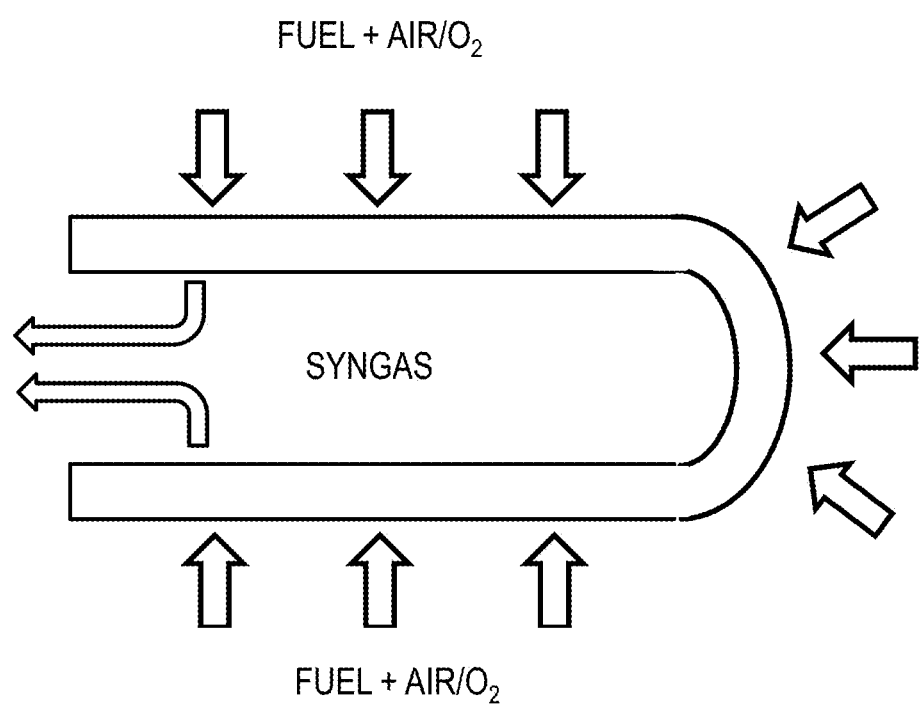
FIG. 4 is a schematic of embodiment of a porous solid oxide fuel cell unit with a closed end according to the present invention.

Referring to FIG. 2, system 10 is arranged as a single unit in a tubular configuration, where the outer layer comprises the cathode layer 12 and the innermost layer the catalyst layer 18. As seen in FIG. 3, a fuel air/$O_2$ mixture is introduced from the exterior through the porous cathode layer 12, the porous electrolyte layer with catalyst 14, the porous anode layer 16, the porous catalyst layer 18, so that syngas is exhausted through lumen of the tube. Referring to FIG. 4, system 10 may also be arranged in a tubular configuration with one end closed (shown as a continuous layer for clarity) so that syngas is exhausted from the open end of the tube.

Figure 5:
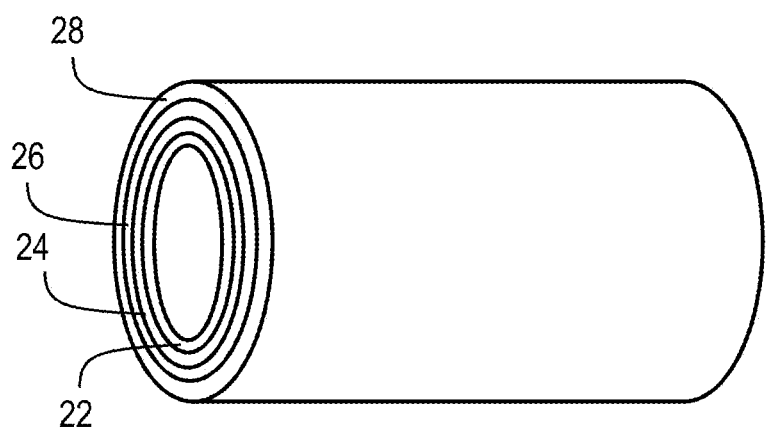
FIG. 5 is a schematic of a second embodiment of a porous solid oxide fuel cell unit according to the present invention
Figure 6:
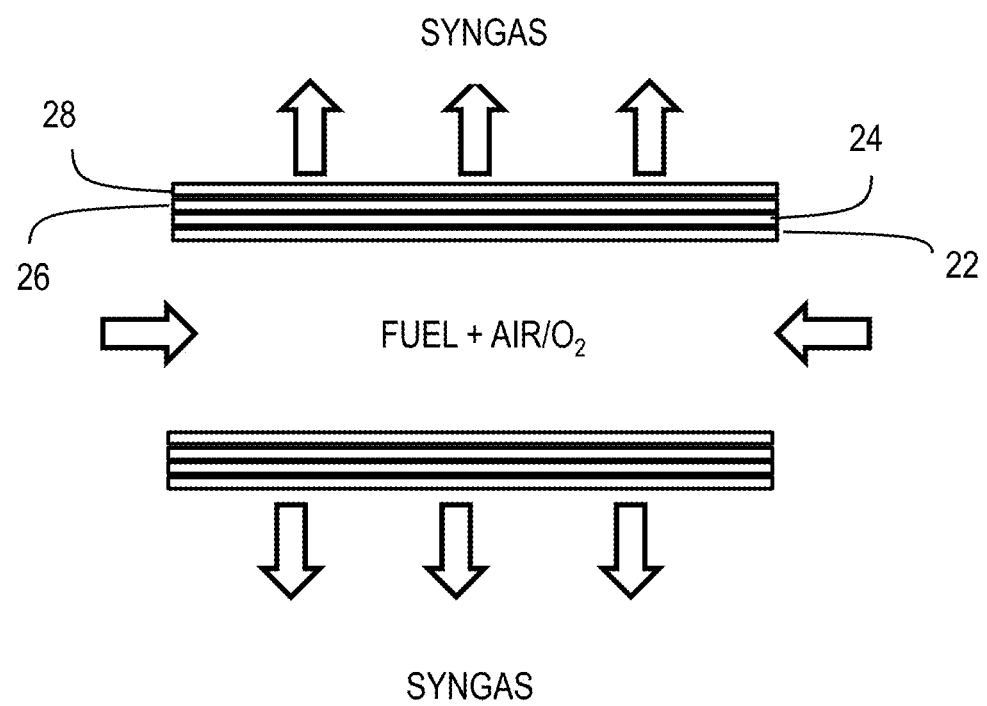
FIG. 6 is a cross-section of the second embodiment of a porous solid oxide fuel cell unit according to the present invention.
Figure 7:
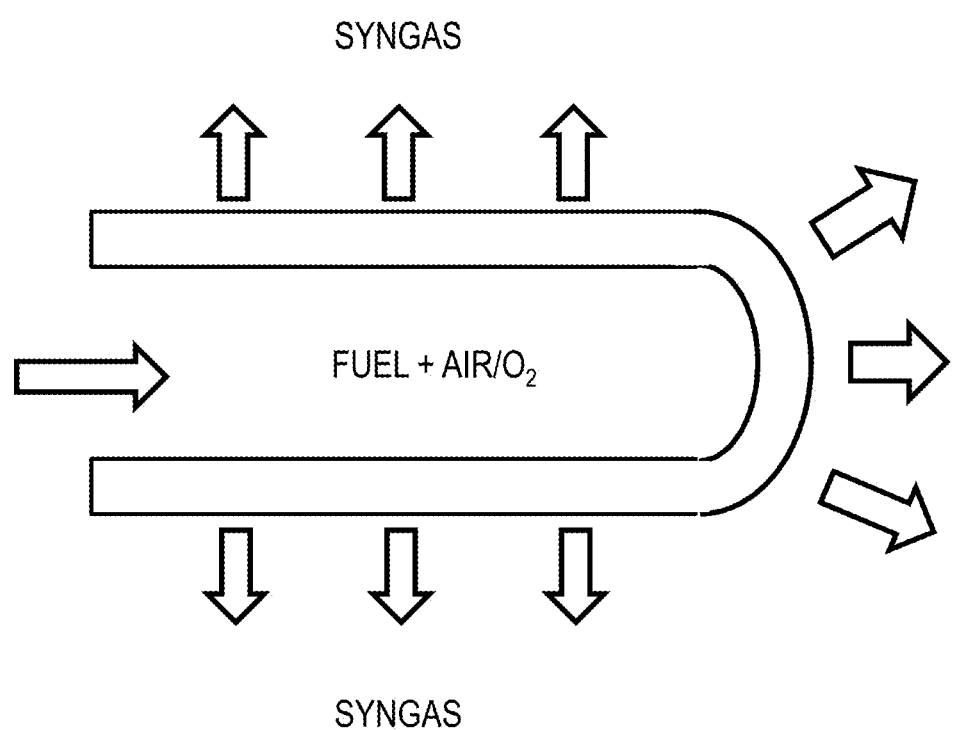
FIG. 7 is a schematic of the second embodiment of a porous solid oxide fuel cell unit with a closed end according to the present invention.

Referring to FIG. 5, there is seen another embodiment of a porous solid oxide fuel cell (PSOFC) system 20 arranged as a single unit with the layers reversed, i.e., the inner layer is the cathode layer 22, then porous electrolyte layer with catalyst 24, porous anode layer 26, and porous catalyst layer 28 as the outer layer is the catalyst layer 28. As seen in FIG. 6, the fuel air/$O_2$ mixture is introduced into the inner cathode layer through the lumen of the tube with syngas exhausted through the outer catalyst layer and out of the outside of tube. As seen in FIG. 7, system 20 may be configured as a tube with a closed end with the fuel air/$O_2$ mixture is introduced into the other end of the tube.

Figure 8:
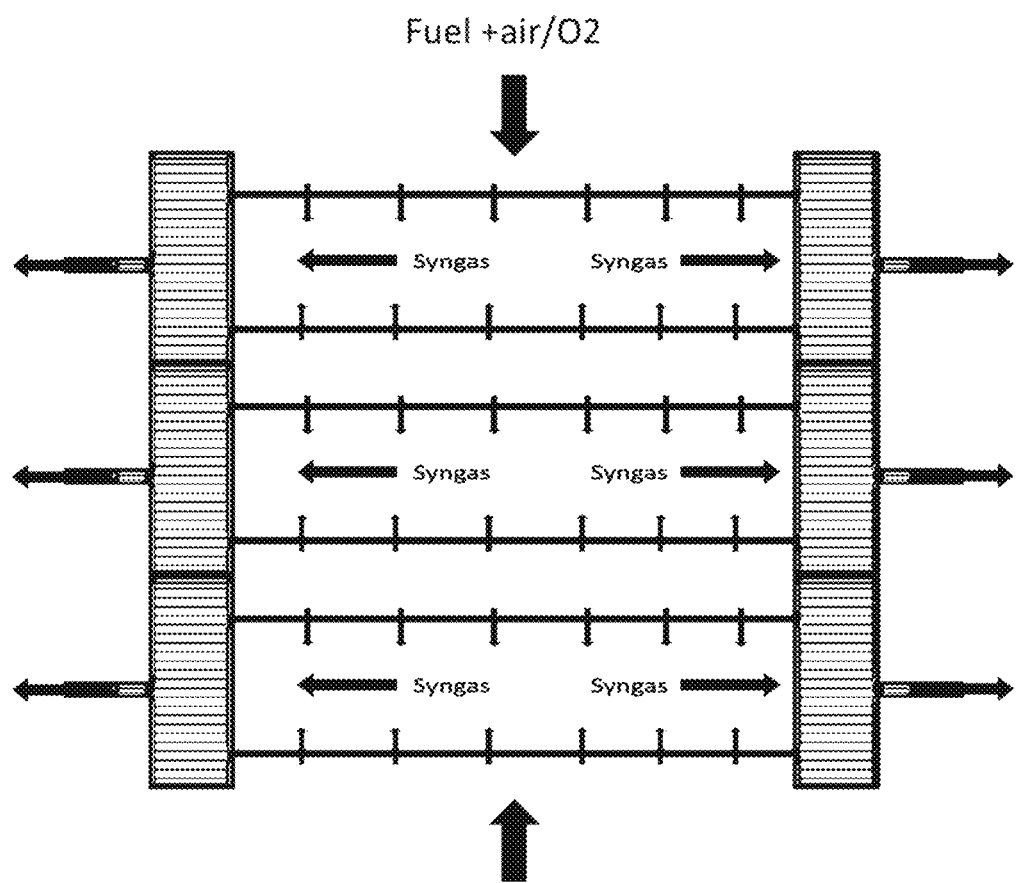
FIG. 8 is a series of porous solid oxide fuel cell units according to the present invention.
Figure 9:
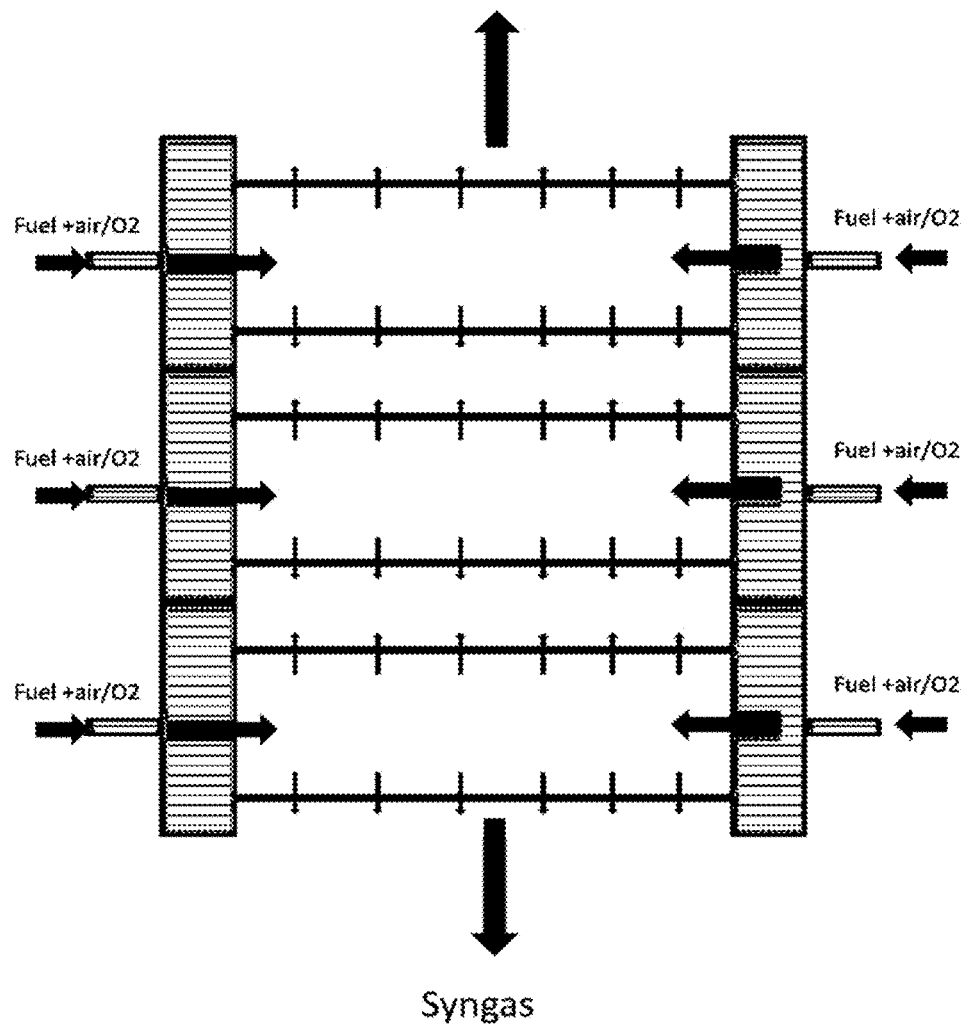
FIG. 9 is another series of porous solid oxide fuel cell units according to the present invention.

Referring to FIGS. 8 and 9, multiple units of the embodiments seen in FIGS. 2-4 and 5-7, respectively, may be stacked together for scalability.

Figure 10:
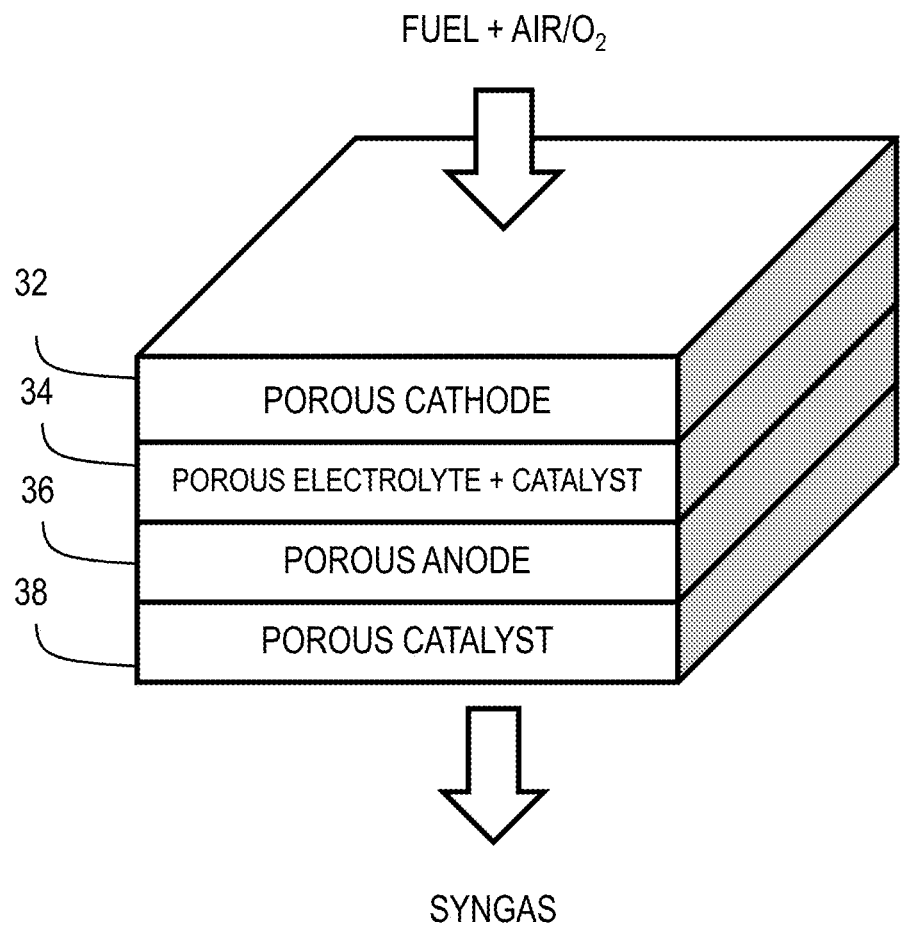
FIG. 10 is a schematic of a third embodiment of a porous solid oxide fuel cell unit according to the present invention.
Figure 11:
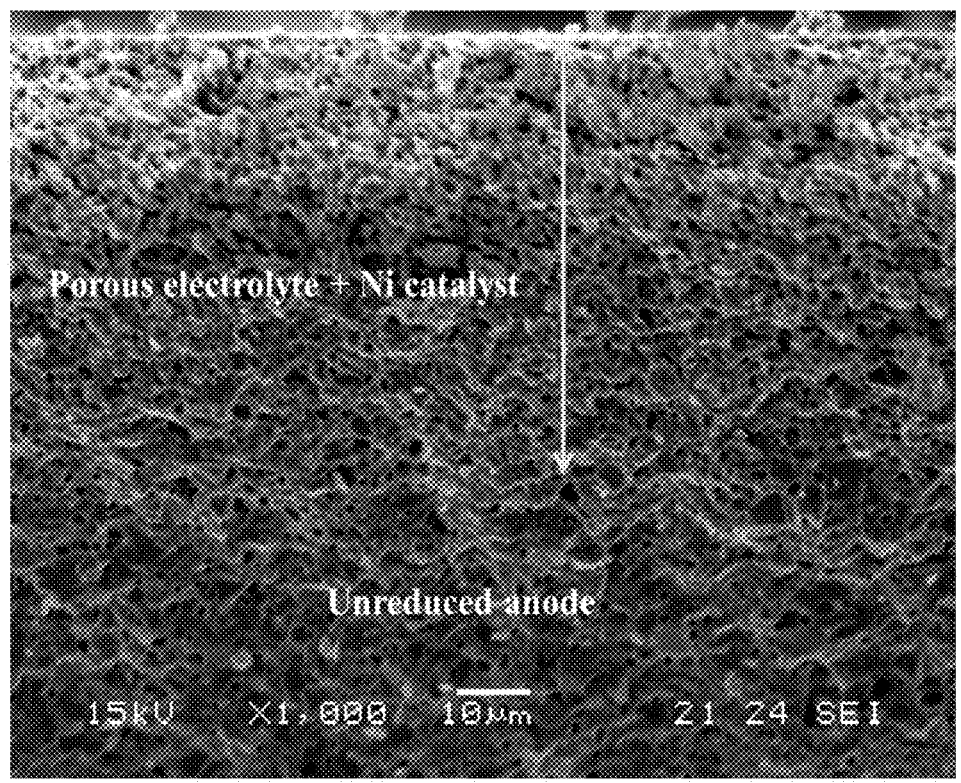
FIG. 11 is an image of the cross-sectional morphology of a half-cell of a porous solid oxide fuel cell unit according to the present invention.
Figure 12:
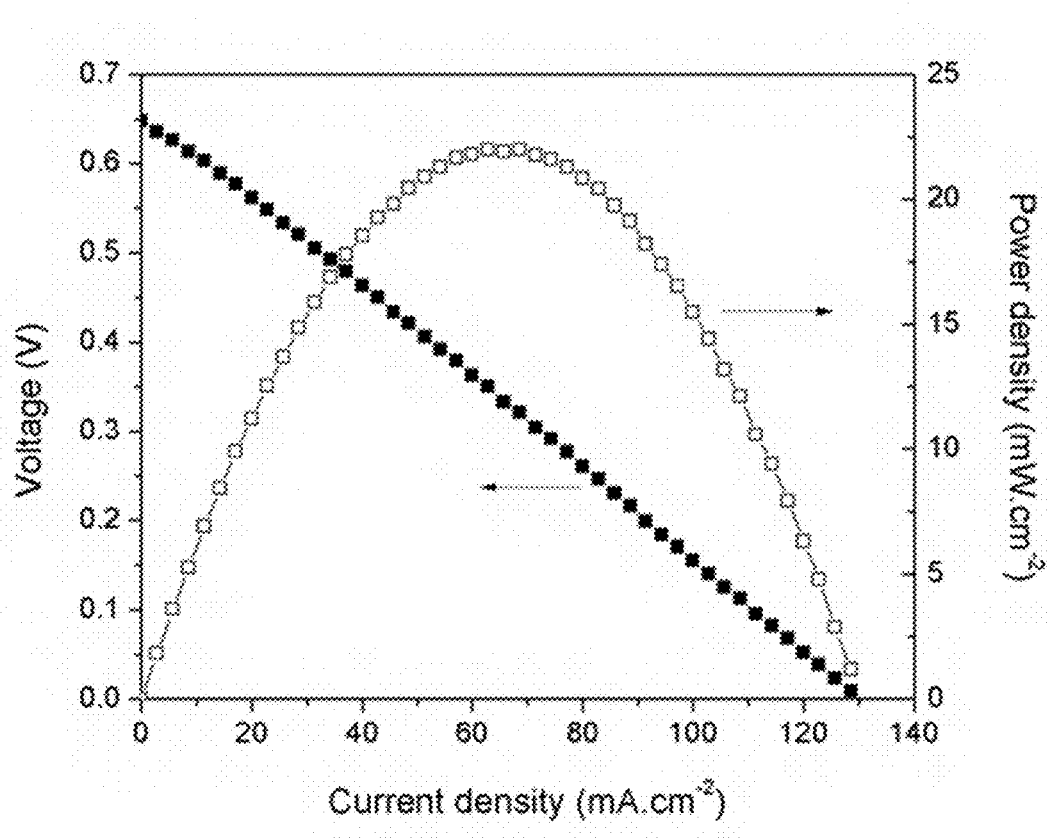
FIG. 12 is a graph of the polarization and power density curves of a porous solid oxide fuel cell unit according to the present invention.

Referring to FIG. 10, a porous solid oxide fuel cell (PSOFC) system 30 may be arranged in a planar configuration having a porous cathode layer 32, a porous electrolyte layer with catalyst 34, a porous anode layer 36, and a porous catalyst layer 38, where each extend along parallel planes. Fuel and air/O2 mixture is introduced at the porous cathode layer and syngas exits from the porous catalyst layer.

Referring to FIG. 7, an exemplary porous electrolyte layer with catalyst was formed with a Ni catalyst. The anode and electrolyte with catalyst layers were formed using a new fabrication technique in which a think pellet of nickel oxide yttria stabilized zirconia (NiO—YSZ, 6:4 w/w) powder was formed by dry pressing. The NiO—YSZ pellet was then sintered in a furnace to 1400° C. for 4 hours. After sintering, one half of the sintered cell was partially reduced in hydrogen gas to create a half cell of Ni—YSZ with the other half of pellet remaining as NiO—YSZ. The half reduced cell was then placed in nitric acid to remove a portion of the Ni from the Ni—YSZ half of the cell leaving a porous YSZ layer with a small portion of Ni catalyst remaining. This porous electrolyte and catalyst layered structure is thus already attached to the NiO—YSZ anode half of the cell. A $Ba_{0.5}Sr_{0.5}Co_{0.8}Fe_{0.2}O_{3-\delta}$ (BSCF) cathode was then applied using wet powder spraying and sintered at 1000° C. for 2 hours. The complete fuel cell was then placed in hydrogen to reduce the anode fully to Ni—YSZ.

Referring to FIG. 7, a porous solid oxide fuel cell according to the present invention achieved a power density of ~230 W/m$^{-2}$ and a maximum current density of ~1300 A/m$^{-2}$. The fuel cell was tested in tubular furnace at 700° C. in methane gas at a flow rate of 50 mL/min. The fuel cell testing was conducted with a Keithley SourceMeter interfaced with LabVIEW software for data acquisition. The 4 probe technique was used in the testing to eliminate the effects of the wire resistance.

The present invention has several advantages. First, it has high thermal shock resistance as the reforming process will generate heat and create a high temperature gradient over the fuel cell. The all-porous structure allows the porous solid oxide fuel cell to run with a high thermal gradient. Unlike a conventional SC-SOFC, the mixture of fuel and air/$O_2$ will pass uniformly through the porous solid oxide fuel cell which reduces the temperature gradient across the fuel cell. Second, the present invention has better fuel utilization as the flow of mixture is highly oriental and all mixtures will pass through the fuel cell to provide for better utilization of fuel. Third, the present invention has a higher open circuit voltage (OCV) as the all porous design prohibits the gas diffusion between the anode exhaust and cathode exhaust. Fourth, the present invention involves less coking as the electrolyte layer with catalyst will partially reform the fuel air/$O_2$ mixture before it gets into the anode layer, thereby limiting direct contact between the anode layer and the hydrocarbon fuels. Finally, the porous solid oxide fuel cell of the present invention does not require an external catalyst to produce the syngas as the catalyst layer can directly utilize the heat released from the fuel cell reactions to generate the syngas.

What is claimed is:

1. A porous solid oxide fuel cell, comprising:
   a porous cathode layer;

a porous electrolyte and catalyst layer adjoining the porous cathode layer;

a porous anode layer adjoining the porous electrolyte and catalyst layer; and a porous catalyst layer adjoining the porous anode layer.

2. The fuel cell of claim 1, wherein the porous cathode layer, the porous anode layer, the porous electrolyte and catalyst layer and the porous catalyst layer are formed into a tube.

3. The fuel cell of claim 2, wherein the porous cathode layer is the outermost layer of the tube.

4. The fuel cell of claim 3, wherein an end of the tube is closed.

5. The fuel cell of claim 2, wherein the porous cathode layer is the innermost layer of the tube.

6. The fuel cell of claim 5, wherein an end of the tube is closed.

7. The fuel cell of claim 1, wherein each of the porous cathode layer, the porous cathode layer, the porous electrolyte and catalyst layer and the porous catalyst layer extend along parallel planes.

8. A method of co-generating electricity and syngas, comprising the steps of:

providing a porous solid oxide fuel cell having a porous cathode layer, a porous electrolyte and catalyst layer adjoining the porous cathode layer, a porous anode layer adjoining the porous electrolyte and catalyst layer, and a porous catalyst layer adjoining the porous anode layer;

introducing a mixture of fuel and oxygen into the porous cathode layer;

collecting syngas from the porous catalyst layer; and collecting electricity across the porous cathode and porous anode layers.

9. The method of claim 8, wherein the porous cathode layer, the porous cathode layer, the porous electrolyte and catalyst layer and the porous catalyst layer are formed into a tube.

10. The method of claim 9, wherein the porous cathode layer is the outermost layer of the tube.

11. The method of claim 9, wherein the wherein the porous cathode layer is the innermost layer of the tube.

12. The method of claim 9, wherein the step of providing a porous solid oxide fuel cell comprises providing a series of stacked porous solid oxide fuel cells.

13. The method of claim 8, wherein the step of introducing a mixture of fuel and oxygen into the porous cathode layer comprising injecting the mixture of fuel and oxygen into the tube and the step of collecting syngas from the porous catalyst layer comprises collecting syngas from around the outside of the tube.

14. The method of claim 8, wherein the step of introducing a mixture of fuel and oxygen into the porous cathode layer comprising introducing the mixture of fuel and oxygen into the outside of the tube and the step of collecting syngas from the porous catalyst layer comprises collecting syngas from inside of the tube.

* * * * *